(12) United States Patent
Covell et al.

(10) Patent No.: US 11,727,318 B2
(45) Date of Patent: Aug. 15, 2023

(54) MEETING ROOM SELECTION BASED ON INTERNET OF THINGS PRIVACY LEVEL

(71) Applicant: International Business Machines Corporation, Armonk, NY (US)

(72) Inventors: Jacob Thomas Covell, New York, NY (US); Lisa Seacat DeLuca, Baltimore, MD (US); Robert Huntington Grant, Marietta, GA (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 17/085,950

(22) Filed: Oct. 30, 2020

(65) Prior Publication Data

US 2022/0138634 A1   May 5, 2022

(51) Int. Cl.
| | |
|---|---|
| *G06Q 10/02* | (2012.01) |
| *G06Q 10/1093* | (2023.01) |
| *G06Q 10/0635* | (2023.01) |
| *G06Q 10/0631* | (2023.01) |
| *H04L 9/40* | (2022.01) |
| *G06N 20/00* | (2019.01) |
| *G16Y 40/50* | (2020.01) |
| *G06F 16/9536* | (2019.01) |

(52) U.S. Cl.
CPC ......... *G06Q 10/02* (2013.01); *G06F 16/9536* (2019.01); *G06N 20/00* (2019.01); *G06Q 10/0635* (2013.01); *G06Q 10/06315* (2013.01); *G06Q 10/1095* (2013.01); *G16Y 40/50* (2020.01); *H04L 63/04* (2013.01)

(58) Field of Classification Search
CPC ............ G06Q 10/02; G06Q 10/06315; G06Q 10/0635; G06Q 10/1095; G06F 16/9536; G06N 20/00; G06N 20/20; G16Y 40/50; H04L 63/04; H04L 63/20
See application file for complete search history.

(56) References Cited

U.S. PATENT DOCUMENTS

| | | | |
|---|---|---|---|
| 9,721,233 B2 | 8/2017 | Norton | |
| 9,813,435 B2 | 11/2017 | Muddu | |
| 10,089,462 B2 | 10/2018 | Touboul | |
| 10,326,760 B2 | 6/2019 | Fitterer | |
| 10,380,348 B2 | 8/2019 | Cheng | |
| 10,754,714 B1* | 8/2020 | Adams | ............ G06F 21/84 |
| 11,240,043 B1* | 2/2022 | Leblang | ............ H04L 67/025 |
| 2010/0037292 A1* | 2/2010 | Light | ............ H04L 63/20 |
| | | | 709/224 |
| 2016/0309303 A1* | 10/2016 | Svenér | ............ H04W 4/33 |
| 2017/0244653 A1 | 8/2017 | Dhoot | |

(Continued)

OTHER PUBLICATIONS

Huang et al., "Princeton IoT Inspector," Princeton.edu, accessed Mar. 10, 2020, 9 pages. <https://iot-inspector.princeton.edu/>.

(Continued)

*Primary Examiner* — Michael A Keller
(74) *Attorney, Agent, or Firm* — Richard B. Thomas

(57) ABSTRACT

Embodiments relate to a system, program product, and method for reserving one or more meeting rooms, and, more specifically, for reserving one or more meeting rooms based on a determination of meeting confidentiality levels and determined Internet of things (IoT) privacy levels associated with the one or more meeting rooms.

20 Claims, 8 Drawing Sheets

(56) References Cited

U.S. PATENT DOCUMENTS

| | | | |
|---|---|---|---|
| 2018/0063154 A1* | 3/2018 | Gullicksen | H04L 63/0227 |
| 2018/0191775 A1 | 7/2018 | Watson | |
| 2018/0278605 A1* | 9/2018 | Fitterer | H04L 12/1822 |
| 2018/0349857 A1 | 12/2018 | Dahir | |
| 2019/0253269 A1* | 8/2019 | Keane | H04L 63/0254 |
| 2019/0332988 A1 | 10/2019 | Adamson | |
| 2019/0364112 A1 | 11/2019 | Bugenhagen | |
| 2020/0097666 A1* | 3/2020 | Weldemariam | G06N 3/08 |
| 2020/0134211 A1* | 4/2020 | Miller | G06F 21/6209 |
| 2021/0158829 A1* | 5/2021 | Gargaro | G10L 21/034 |

OTHER PUBLICATIONS

Lomas, "Spy on your smart home with this open source research tool," TechCrunch.com, Apr. 13, 2019, 3 pages. <https://techcrunch.com/2019/04/13/spy-on-your-smart-home-with-this-open-source-research-tool/>.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

MEETING ROOM SELECTION BASED ON INTERNET OF THINGS PRIVACY LEVEL

BACKGROUND

The present disclosure relates to reserving one or more meeting rooms, and, more specifically, for reserving one or more meeting rooms based on a determination of meeting confidentiality levels and determined Internet of things (IoT) privacy levels of the one or more meeting rooms.

Many known conference and meeting room scheduling systems include features for reserving meeting rooms for meetings. The meetings will vary with respect to the security interests of the meeting attendees, and the sensitivity of the subjects discussed and presentations delivered therein. At least some known meeting rooms include IoT devices that have some form of listening and recording features. In addition, mobile devices that have some form of listening and recording features are nearly ubiquitous.

SUMMARY

A system, computer program product, and method are provided for reserving one or more meeting rooms, and, more specifically, for reserving one or more meeting rooms based on a determination of meeting confidentiality levels and determined Internet of things (IoT) privacy levels of the one or more meeting rooms.

In one aspect, a computer system for reserving one or more meeting rooms is provided. The system includes a processing device operably coupled to a memory device. The memory device is configured to receive at least a portion of a meeting room database. The database includes data associated with each meeting room of a plurality of meeting rooms. The processing device is configured to calculate, for each meeting room of the plurality of meeting rooms, a respective privacy risk score and analyze a content of a group meeting invitation. The processing device is also configured to determine a sensitivity level of the group meeting invitation and compare the sensitivity level of the group meeting invitation with the privacy risk score for each meeting room of the plurality of meeting rooms. The processing device is further configured to select one of the plurality of meeting rooms having a privacy risk score corresponding to the sensitivity level of the group meeting invitation.

In another aspect, a computer program product is provided. The computer program product includes one or more computer readable storage media and program instructions collectively stored on the one or more computer-readable storage media. The program instructions include program instructions to for reserving one or more meeting rooms. The program instructions also include program instructions to determine a sensitivity level of the group meeting invitation, and to compare the sensitivity level of the group meeting invitation with the privacy risk score for each meeting room of the plurality of meeting rooms. The program instructions further includes program instructions to select one of the plurality of meeting rooms having a privacy risk score corresponding to the sensitivity level of the group meeting invitation.

In yet another aspect, a computer-implemented method for reserving one or more meeting rooms is provided. The method includes calculating, for each meeting room of a plurality of meeting rooms, a respective privacy risk score, and analyzing a content of a group meeting invitation. The method also includes determining a sensitivity level of the group meeting invitation, and comparing the sensitivity level of the group meeting invitation with the privacy risk score for each meeting room of the plurality of meeting rooms. The method further includes selecting one of the plurality of meeting rooms having a privacy risk score corresponding to the sensitivity level of the group meeting invitation.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
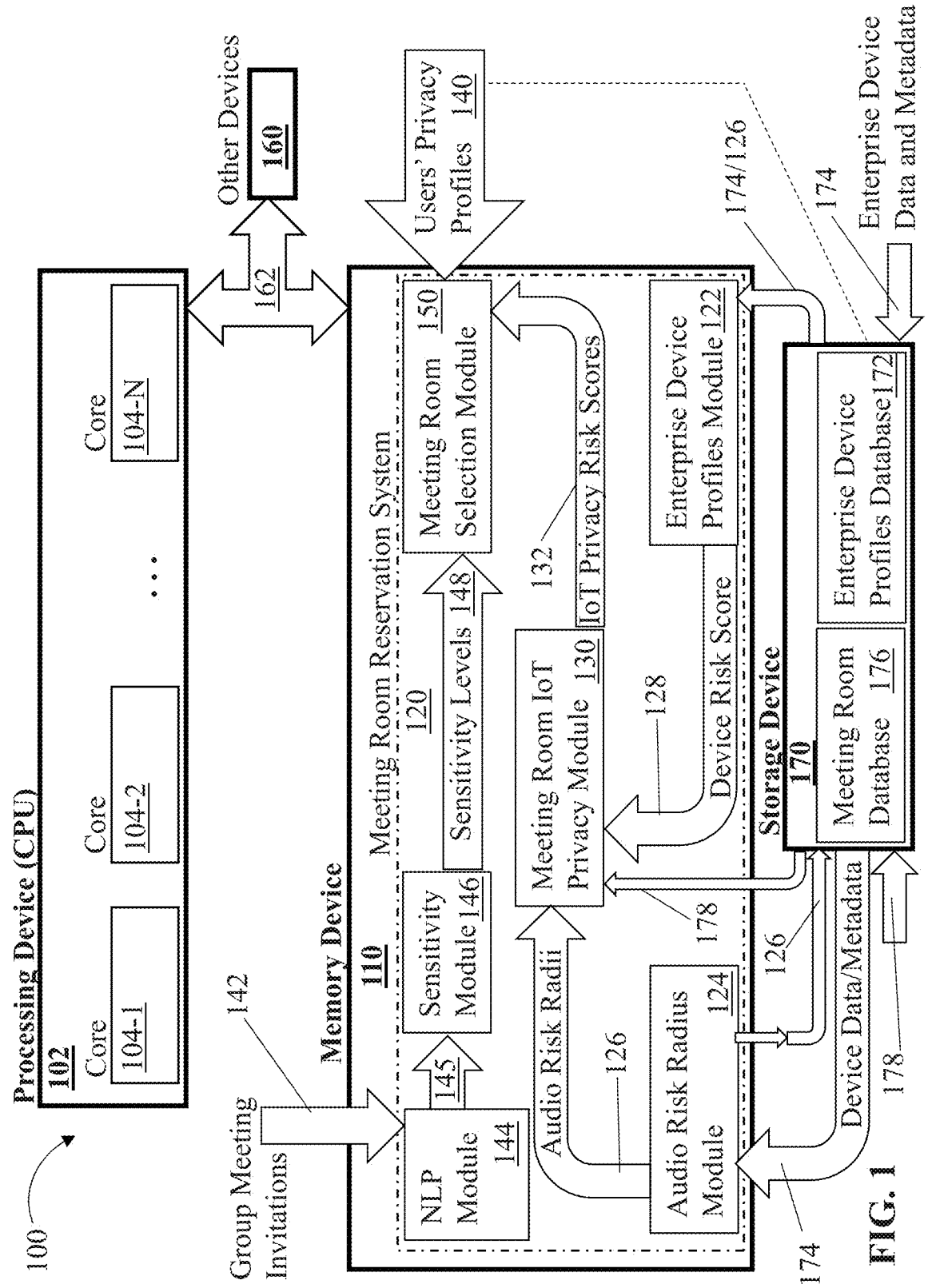
FIG. 1 is a schematic diagram illustrating a computing environment suitable for reserving one or more meeting rooms, and, more specifically, for reserving one or more meeting rooms based on a determination of meeting confidentiality levels and determined Internet of things (IoT) privacy levels of the one or more meeting rooms, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known conference and meeting room scheduling systems include features for reserving rooms for meetings. The meetings will vary with respect to the security interests of the meeting attendees, and the sensitivity of the subjects discussed and presentations delivered therein. For example, if one meeting includes senior management individuals and the subject will be the next quarter's financial forecasts, and another meeting is for a variety of other lower-level employees to discuss this year's summer outing, a difference in the privacy and security requirements and sensitivity of the two meetings is intuitive. At least some known meeting rooms include IoT devices that have some form of listening and recording features, for example, and without limitation, land-line telephones, laptop computers, desktop computers, presentation recording cameras, and smart presentation boards. In addition, many attendees will arrive at the meeting room with one or more mobile devices that have some form of listening and recording features, including, without limitation, laptop computers, mobile phones, and smart watches. In addition, many meeting rooms are physically located next to other offices and other meeting rooms that also include similar IoT devices and have attendees with various forms of IoT devices entering and leaving. Accordingly, meeting rooms will differ with respect to their features to supporting a proper level of security for some information.

A system, computer program product, and method are disclosed and described herein for reserving one or more meeting rooms, and, more specifically, for reserving one or more meeting rooms based on a determination of meeting confidentiality levels and determined Internet of things (IoT) privacy levels of the one or more meeting rooms. The embodiments disclosed herein facilitate optimizing meeting room selection based on the privacy-context of the meeting and the perceived IoT privacy-level of the available meeting rooms. In at least some embodiments disclosed herein, the meeting room scheduling system recognizes the capabilities of an IoT device to record confidential information and compares the presence of such devices in a set of available reservable spaces to recommend the space that aligns with a privacy score associated with the topics and individuals attending the meeting. The privacy score is determined by the system and method described herein. In addition, in at least some embodiments, the meeting room scheduling system may be implemented seamlessly with some known reservation and facilities management systems to enhance the meeting room reservation features. Accordingly, the present disclosure describes embodiments that match meeting rooms to the determined security requirements for the attendees and subject matter.

In at least some embodiments, the system and methods described herein consider the various ways that data can be breached in certain environments, including, without limitation, listening in on real time conversations that are happening in person or on a phone call through a mobile device, and recording sensitive data on a whiteboard through a conference room camera or a mobile device. In addition, real-time notifications are transmitted to attendees of particular meetings of certain levels of security via various platforms that include, without limitation, mobile computing devices such as laptop computers, smart phones, and smart watches in the event that the privacy score dynamically changes. Accordingly, any potential security issues are either mitigated before the meeting or detected during the meeting.

In one or more embodiments, the system and methods described herein include additional features that further enhance the privacy scoring features disclosed herein such as accepting inputs including, and without limitation, news focused on determining device attacks at similar companies available from predetermined outlets, tracking known intrusion attempts on the present enterprise's network, and tracking known recalls for devices with potential security deficiencies.

In some embodiments, the systems disclosed herein are incorporated into an existing meeting room selection software tool. In at least one embodiment, the systems described herein are implemented as a stand-alone meeting room selection software tool. In at least some embodiments, an existing meeting room database is maintained. In at least some embodiments, a meeting room database is either established or augmented. In one or more embodiments, the meeting room data includes, without limitation, attributes such as room identification numbers, location of the meeting rooms in the enterprise's office building, the physical size, i.e., the dimensions of the meeting rooms, the rated attendee capacities, the known presentation output devices, the current availability, and the known capacities of the existing information technology infrastructure, including accommodations for portable devices carried by the attendees and wireless and wired throughput capacities. Accordingly, the attributes of all of the available meeting spaces are recorded into a database that is used as described further herein.

The methods described herein include using known methods to develop a profile of each enterprise device. To develop such enterprise device profiles, the enterprise will analyze the signal strengths of all known devices in relation to one or more of an existing router, a centralized point, and an inspecting device within the enterprise's facility. In one or more embodiments, the method includes using known trilateration techniques to determine the location of each device within the facility. In at least some embodiments, these operations facilitate generating an inventory of the known devices within the facility. Such an inventory of existing devices within the facility may be used to categorize a least a first portion of the equipment as "suspicious" and at least a second portion of the equipment as "normal."

In at least some embodiments, the metadata of each of the enterprise's on-network devices is captured, where such metadata includes, without limitation, any assigned unique identifier (UID), make, model, device name, broadcasted bands, capturing capabilities, and microphone sensitivity. The captured metadata and the captured data of the enterprise devices may be used to perform the categorization of the devices. Such categorization may be established through using known mechanisms, including collection of available technical data from the original equipment manufacturers (OEMs) and known reviews and analyses of the equipment. In at least some embodiments, a numerical range is determined to assign numerical values across the spectrum of "suspicious" and "normal" as described further herein. The locations of the "suspicious" and "normal" equipment is captured.

In some embodiments, the system and methods disclosed herein include using external factors and knowledge to enhance the security analyses of respective device profiles. For example, established intrusions on specific pieces of enterprise equipment, or substantially equivalent to such equipment, that have occurred at the present enterprise or other enterprises may be evaluated. In addition, known data attacks, whether successful or not, that have occurred on the respective equipment and if there have been any OEM recalls of the respective equipment are analyzed to determine potential security risks and concerns. Accordingly, the combination of the collected data and metadata of the enterprises devices is used to develop the respective device profiles, and the detailed descriptions and evaluations of all of the enterprise IoT devices on the premises are collected and maintained to determine the risk factors with each device as described further herein.

In the embodiments described herein, a portion of the device profiles includes a "device risk score" that is calculated and assigned to each enterprise device. In some embodiments, the device risk score is a calculated numerical value that is within the range of 0 to 100, where a value of 0 is indicative of a significant risk and a value of 100 is indicative of no risk. In some other embodiments, the spectrum is reversed such that a value of 0 is indicative of no risk and a value of 100 is indicative of a significant risk. In yet other embodiments, a different numerical range can be used, such as 1-10, or any range that enables operation of the systems and methods as described herein. The device risk score is partially based on the capturing of the capabilities and the microphone sensitivities associated with each respective device. For example, numerical values are assigned to the presence and listening capabilities of a microphone on the device based on a scale determined by the enterprise as a function of the spectrum of capabilities across a range of the enterprise's known devices. The wireless transmission capabilities and the size of the respective antennas of the respective devices are also considered, and the respective assigned numerical values are again based on the spectrum of capabilities across a range of the enterprise's known devices. In general, the more pronounced the capabilities of the enterprise devices to record and transmit the recorded information, the lower the numerical values assigned to the respective features.

The device risk score is also partially based on the historic behavior of each respective device, where a numerical range is assigned to those enterprise devices that range between "suspicious" that would receive a relatively lower numerical value than enterprise devices exhibiting "normal" behavior that would receive a relatively higher numerical value. The relative numerical values would fall along a spectrum developed by the enterprise based on factors that include, without limitation, the nature, frequency, and severity of the suspicious behavior. In addition to the enterprise devices, devices that may be brought onto the premises of the enterprise may also be considered similarly. In one or more embodiments, a device risk score may be calculated through an algorithm such as: Device Risk Score=[(microphone)*(WiFi)*(antenna capacity)]+[(known device)*(unknown capabilities)], where "microphone," "WiFi," and "antenna capacity" represent the numerical values for the microphone capabilities, the wireless capabilities, and the capacity of the antenna to transmit the recorded information, respectively. The numerical values attributed to the "known device" factor are based on the value assigned along the "suspicious" to "normal" behavior spectrum and the "unknown capabilities" factor is a numerical value assigned to features that may not have been thoroughly determined. Accordingly, the enterprise device profiles of the respective devices include the respective device risk scores to indicate the determined security risk with each respective enterprise IoT device.

Based at least in part on the capturing capabilities and the microphone sensitivities associated with each device, an "audio risk radius" distance threshold value is calculated, where the audio risk radius distance threshold is an estimated maximum distance by which a device's microphone could accurately record conversations. In some embodiments, the known enterprise devices are individually tested to either determine or confirm their capabilities in the particular office space in which they reside, or where they have the potential to be moved. Accordingly, the established risk associated with each respective enterprise IoT device is at least partially established through determination of the respective devices listening capabilities.

In at least some embodiments, the location of each known device and the respective audio risk radius determined as described herein is compared with the location of each meeting room stored in the meeting room database as described herein. For example, such a comparison may determine the calculated audio risk radius of the associated enterprise device as presently located within the respective meeting room extends beyond one or more of the measured dimensions of the meeting room. Accordingly, matching the listening features of the respective IoT devices to the infrastructure of the enterprise facilitates establishing the specific risks associated with the respective enterprise IoT devices.

In one or more embodiments, an "IoT Privacy Risk Score" (sometimes referred to as "IoT privacy levels" and "privacy risk score") for each meeting room is calculated, based on the previously calculated device risk scores and the calculated audio risk radii for each device. In some embodiments, additional factors particular to the enterprise may be included. In some embodiments, the IoT privacy risk score, is a calculated numerical value that is within the range of 0 to 100, where a value of 0 is indicative of significant risk and a value of 100 is indicative of substantially no risk. In at least some embodiments, an IoT privacy risk score within a sub-range of 0-20 is indicative of a non-private meeting room, where multiple devices that are deemed "suspicious" are within listening range. Also, an IoT privacy risk score within a sub-range of 20-50 is indicative of an average privacy meeting room, where multiple devices, classified by "normal" behavior are within listening range. Further, an IoT privacy risk score within a sub-range of 50-90 is indicative of a relatively private meeting room, where few devices, classified by "normal" behavior, are within listening range. Moreover, an IoT privacy risk score within a sub-range of 90-100 is indicative of an extremely private/secure meeting room, where there exists a significantly reduced opportunity for malicious/corrupted "listening" devices. Accordingly, the privacy value for each meeting room is stored, managed, and updated as needed.

In addition to the previous data collection and generation, the privacy profiles of the potential users of the group meeting rooms are stored. For example, a financial executive will likely have a privacy level requirement that is at a heightened level as compared to an engineer in the maintenance group. Specifically, in at least some embodiments, the users' privacy profiles are generated based on factors that include, without limitation, the set of assigned responsibilities and the associated workstreams, the relative level within the organization, availability of access to confidential information, frequency of obtaining access to confidential information, and frequency of use of enterprise encryption and decryption features. In some embodiments, the level of privacy established within the users' profiles are determined through a predefined level associated with the users' job title. Accordingly, the behaviors of the users are leveraged to assign rooms with the appropriate level of security.

The method further includes leveraging the data collected and generated to reserve a meeting room. In one embodiment, a user logs into a meeting room reservation application, i.e., the user portal to the meeting room reservation system. In some embodiments, the meeting room reservation application is a stand-alone application. In some embodiments, the meeting room reservation application is a portion of another application, for example, and without limitation, an email application or a facilities management application. In some embodiments, the meeting room reservation application is accessible through a mobile device app. Once logged into the application, the user creates a group meeting invitation.

The method further includes the meeting room reservation system analyzing the group meeting invitation. Specifically, the meeting room reservation system analyzes the group meeting invitation to determine the privacy level required for the group meeting. For example, highly confidential financial details of the enterprise will likely require the highest level of privacy, while routine group informational meetings will likely require a lower level of privacy. Therefore, the meeting room reservation system references the privacy profiles of the user that is creating and sending the invitation and the users that are the invitees to the planned group meeting. In some embodiments, if the user creating and sending the invitation is an administrative assistant to the user requesting the group meeting, the meeting room reservation system will use the privacy profile of the meeting chairperson that requested the group meeting.

Once the group meeting invitation is drafted and submitted to the meeting room reservation system, the system uses natural language processing (NLP) to analyze the content of the invitations. Specifically, the NLP features analyze at least, without limitation, keywords in the subject line, the text in the body of the invitation, the agenda, any attachments, and other invitation attributes. For example, a subject line of "Q4 Fiscal Review" will be deemed to be a more sensitive subject that a subject line of "Summer Golf Outing."

In addition, the meeting room reservation system will analyze the previous behavior of the users that will be attendees, including the group meeting chair, that are invited to the group meeting. In at least one embodiment, the users' behavior patterns are maintained in the users' privacy profiles. In one or more embodiments, the users' behavior patterns are stored in the meeting room database. In at least some other modules, the users' behavior patterns are maintained within a separate portion of a broader computing system. The analysis of the individual users' meeting patterns determines, for example, and without limitation, the degree of privacy typically requested, if such requests are made, with the meeting room requests and the previous behavior of the group as a whole, or, in some embodiments, portions of the group. The analysis also includes analyzing the group to determine, without limitation, if the group meets on a recurrent basis and requests meeting rooms with a certain degree of privacy. In at least one embodiment, the meeting room reservation system includes cognitive learning features that incorporate one or more learning algorithms and learning models to determine the pattern of the users' behavior and to enable the meeting room reservation system to predict the users' future behaviors with respect to meeting room selection based on their previous behavior. Accordingly, the behaviors of the users are used to assign rooms with the appropriate level of security.

Once the meeting room reservation system has completed the analyses, the system predicts the classification of the meeting invitations by sensitivity level, and proceeds to classify the meeting invitation accordingly. In at least one embodiment, there are three sensitivity levels, where three is a non-limiting value, that includes low sensitivity, medium sensitivity, and high sensitivity. In at least some embodiments, the sensitivity classification is automatically assigned based on the participants or requirements.

The meeting room reservation system optimizes the meeting room selection based on the sensitivity level of the meeting and the current IoT privacy risk score associated with each meeting room, both determined as described herein. In at least some of the embodiments, the meeting room reservation system prioritizes the more sensitive meetings, i.e. most meetings with a high sensitivity level, and at least a portion of the medium sensitivity level and can re-assign rooms as necessary, i.e., change the meeting location of a less sensitive meeting assigned to an extremely secure room, when a more sensitive meeting for the extremely secure room is created.

In at least some embodiments, the meeting room reservation system analyzes the behavior of the invitation sender and the invitees for the issued group meeting invitations as feedback into the cognitive learning features of the system. For example, and without limitation, the cognitive learning features evaluate if the invitation sender accepted or rejected the meeting room selection, and if rejected, did the invitation sender select a more, or less, secure room. In addition, in at least some embodiments, the behavior of the other attendees is analyzed as well to determine if the invitations were accepted given the selected room, or if any of the attendees suggested a different room based on the sensitivity of the subject matter of the meeting.

Furthermore, in at least some embodiments, the meeting room reservation system includes sufficient flexibility to change the scheduled room and notify the attendees if either of the list of attendees, the inventory of IoT devices in the scheduled room, or the subject matter of the meeting changes such that the calculated sensitivity levels change.

In addition, in at least some embodiments, the meeting room reservation system as described herein includes features that enable dynamic aspects of the system. For example, the meeting room reservation system adjusts the IoT privacy risk score for the room in real-time as connected devices move throughout the building. Moreover, the meeting room reservation system will issue real-time notifications to the attendees in the meeting room that the IoT privacy risk score falls below a predetermined threshold during the scheduled meeting time. Accordingly, such real-time notifications are transmitted to the attendees of particular meetings of certain levels of security via various platforms that include, without limitation, mobile computing devices such as laptop computers, smart phones, and smart watches in the event that the privacy score dynamically changes.

Referring to FIG. 1, a schematic diagram is provided illustrating a computing environment, i.e., a computer system 100 suitable for reserving one or more meeting rooms, and, more specifically, for reserving one or more meeting rooms based on a determination of meeting confidentiality levels and determined Internet of things (IoT) privacy levels of the one or more meeting rooms. The computer system 100 includes one or more multi-core processing devices 102, sometimes referred to as central processing units (CPUs), where, in the exemplary embodiment, one multi-core processing device 102 is shown. Each multi-core processing device 102 includes two or more cores 104, including, in the exemplary embodiment, a first core 104-1, a second core 104-2, and an $N^{th}$ core 104-N, where N can be any integer that enables operation of the multi-core processing devices 102 and the computer system 100.

The computer system 100 also includes a memory device 110 that is communicatively and operably coupled to the processing device 102. The memory device 110 includes a meeting room reservation system 120 therein. In at least some embodiments, the meeting room reservation system 120 is implemented by the one or more multi-core processing devices 102 that are configured to implement such systems. The meeting room reservation system 120 includes an enterprise device profiles module 122 and an audio risk radius module 124, where modules 122 and 124 are discussed further herein.

The computer system 100 also includes one or more other devices 160 that include, without limitation, input devices such as keyboards and output devices such as monitors and printers. The other devices 160 are in operable communication with the processing device 102 and the memory device 110 to communicate input/output (I/O) data 162 therebetween.

The computer system 100 further includes at least one storage device 170 (only one storage device 170 shown in FIG. 1) communicatively coupled to the memory device 110. The storage device 170 is any device that provides storage to the data to enable operation of the computer system 100 and the meeting room reservation system 120 as described herein. In at least one embodiment, the storage device 170 includes an enterprise IoT device profiles database 172 that maintains enterprise IoT device profile data and metadata 174. In at least one embodiment, the enterprise IoT device profile data and metadata 174 is entered into the enterprise IoT device profiles database 172 through one or more input devices included within the other devices 160. The enterprise IoT device profile data and metadata 174 is communicated with the enterprise IoT device profiles module 122.

The enterprise IoT device data and metadata 174 includes information on each and every IoT device within and proximate the meeting rooms throughout the enterprise facility. In one or more embodiments, the enterprise IoT device data and metadata 174 includes for each respective device, and without limitation, signal strength data, device location, categorization as one of "suspicious" and "normal." In addition, in some embodiments, the enterprise IoT device data and metadata 174 includes the type of device, e.g., and without limitation, land-line telephones, laptop computers, desktop computers, presentation recording cameras, smart presentation boards, enterprise mobile devices such as smart phones, pads, and smart watches, and otherwise seemingly innocuous devices such as, and without limitation, Internet-connected refrigerators.

Further, in some embodiments, the enterprise IoT device data and metadata 174 includes external factors and knowledge to enhance the security analyses of respective device profiles, including, and without limitation, news focused on determining device attacks at similar companies available from predetermined outlets, tracking known intrusion attempts on the present enterprise's network, and tracking known recalls for devices with potential security deficiencies. In addition, for example, and without limitation, additional external information includes established intrusions on specific pieces of enterprise equipment, or substantially equivalent to such equipment, that have occurred at the present enterprise or other enterprises, known data attacks, whether successful or not, that have occurred on the respective equipment, and if there have been any OEM recalls of the respective equipment. Moreover, such external factors and knowledge may include a collection of available technical data from the OEMs and known reviews and analyses of the equipment.

Moreover, in at least some embodiments, the enterprise IoT device data and metadata 174 includes the captured metadata of each of the enterprise's on-network device, where such metadata includes, without limitation, any assigned unique identifier (UID), make, model, device name, broadcasting bands, capturing capabilities, and microphone sensitivity. The captured metadata and the captured data of the enterprise devices may be used to perform the categorization of the devices into the "suspicious" and "normal" categories. In at least some embodiments, a numerical range is determined to assign numerical values across the spectrum of "suspicious" and "normal" as described further herein. The numerical values and the locations of the "suspicious" and "normal" equipment are captured into the enterprise IoT device data and metadata 174.

In at least some embodiments, to further enhance the security of the meeting rooms within the enterprise's facility, the enterprise IoT device data and metadata 174 includes data and metadata for devices that are likely to be carried into, or proximate, the meeting rooms. Examples of such non-enterprise IoT devices include, without limitation, smart phones, smart pads, smart watches, and laptops. In one or more embodiments, such data and metadata collection is performed upon the computer system 100 sensing the presence of the non-enterprise device as discussed further herein. The enterprise IoT device data and metadata 174 is communicated with the audio risk radius module 124 as described further herein.

Also, in at least some embodiments, the storage device 170 also includes a meeting room database 176 that maintains meeting room data 178. In at least one embodiment, the meeting room data 178 is entered into the meeting room database 176 through one or more input devices included within the other devices 160. Accordingly, the computer system 100 includes an enterprise IoT device profiles database 172 that stores enterprise IoT device profile data and metadata 174, and a meeting room database 176 that stores the meeting room data 178, both for use by the meeting room reservation system 120.

The audio risk radius module 124 is configured to calculate audio risk radii 126 that is based on at least the captured recording sensitivities and capabilities of the enterprise IoT devices captured in the enterprise IoT device profiles database 172. In some embodiments, the calculated audio risk radii 126 is stored in the enterprise IoT device profiles database 172.

In at least some of the embodiments, the enterprise IoT device profiles module 122 is configured to generate a device risk score 128 that is calculated and assigned to each enterprise IoT device. The device risk score 128 is partially based on the capturing of the capabilities and the microphone sensitivities associated with each respective device, such data maintained as enterprise IoT device data and metadata 174 in the enterprise IoT device profiles database 172. For example, numerical values are assigned to the presence and listening capabilities of a microphone on the device based on a scale determined by the enterprise as a function of the spectrum of capabilities across a range of the enterprise's known devices.

The device risk score 128 is also partially based on the historic behavior of each respective device, where a numerical range is assigned to those enterprise devices that range between "suspicious" that would receive a relatively lower numerical value than enterprise devices exhibiting "normal" behavior that would receive a relatively higher numerical value. The relative numerical values would fall along a spectrum developed by the enterprise based on factors that include, without limitation, the nature, frequency, and severity of the suspicious behavior. In addition to the enterprise devices, devices that may be brought onto the premises of the enterprise may also be considered similarly. The wireless transmission capabilities and the size of the respective antennas of the respective devices are also considered when determining the device risk score 128. In general, the more pronounced the capabilities of the enterprise devices to record and transmit the recorded information, the lower the numerical values assigned to the respective features.

The audio risk radius module 124 and the enterprise device profiles module 122 are communicatively coupled to a meeting room IoT privacy module 130. Specifically, the audio risk radii 126 and the device risk scores 128 may be transmitted from the audio risk radius module 124 and the enterprise device profiles module 122, respectively. The meeting room IoT privacy module 130 is also communicatively coupled to the storage device 170 such that meeting room data 178 may be transmitted to the meeting room IoT privacy module 130. The meeting room IoT privacy module 130 is configured to compare the location of each known device and the respective audio risk radius 126 determined as described herein with the location of each meeting room stored in the meeting room database 176 as described herein. Such a comparison may determine the calculated audio risk radius 126 of the associated enterprise device as presently located within the respective meeting room extends beyond one or more of the measured dimensions of the meeting room. Accordingly, matching the listening features of the respective IoT devices to the infrastructure of the enterprise facilitates establishing the specific risks associated with the respective enterprise IoT devices.

In one or more embodiments, the meeting room IoT privacy module 130 is also configured to determine an IoT privacy risk score 132 for each meeting room based on the previously calculated device risk scores 128 and the calculated audio risk radius 126 for each device. In at least some embodiments, the comparison of the location of each known device and the respective audio risk radius 126 determined as described herein with the location of each meeting room stored in the meeting room database 176 is also used to calculate the IoT privacy risk score 132. In some embodiments, additional factors particular to the enterprise may be included. In at least some embodiments, the IoT privacy risk score 132 is a calculated numerical value that is within the range of 0 to 100, where a value of 0 is indicative of significant risk and a value of 100 is indicative of substantially no risk. In at least some embodiments, an IoT privacy risk score within a sub-range of 0-20 is indicative of a non-private meeting room, where multiple devices that are deemed "suspicious" are within listening range. Also, an IoT privacy risk score within a sub-range of 20-50 is indicative of an average privacy meeting room, where multiple devices, classified by "normal" behavior are within listening range. Further, an IoT privacy risk score within a sub-range of 50-90 is indicative of a relatively private meeting room, where few devices, classified by "normal" behavior, are within listening range. Moreover, an IoT privacy risk score within a sub-range of 90-100 is indicative of an extremely private/secure meeting room, where there exists a significantly reduced opportunity for malicious/corrupted "listening" devices. Accordingly, the privacy value for each meeting room is stored, managed, and updated as needed.

The aforementioned portions of the meeting room reservation system 120 facilitates preparing the meeting room reservation system 120 for reserving one or more meeting rooms. The remainder of the meeting room reservation system 120 facilitates selecting the appropriate group meeting room based on the factors discussed further herein.

The meeting room reservation system 120 also includes users' privacy profiles 140 resident, in at least some embodiments, within the meeting room database 176 in the storage device 170. In other embodiments, the users' privacy profiles 140 are maintained in a separate database. The users' privacy profiles 140 are leveraged to assign rooms with the appropriate level of security as discussed further herein. In at least one embodiment, the meeting room reservation system 120 further includes a natural language processing (NLP) module 144 that is configured to receive group meeting invitations 142 initiated from input devices associated with the other devices 160. The meeting room reservation system 120 also includes a sensitivity module 146 operatively coupled to the NLP module 144 and configured to receive the analyzed group meeting invitations 145. In addition, the meeting room reservation system 120 includes a meeting room selection module 150 operatively coupled to the sensitivity module 146, where the meeting room selection module 150 is configured to receive the users' privacy profiles 140, and the confidentiality, i.e., sensitivity levels 148, and then selects the appropriate meeting room based on the security sensitivity level of the meeting.

Figure 2:
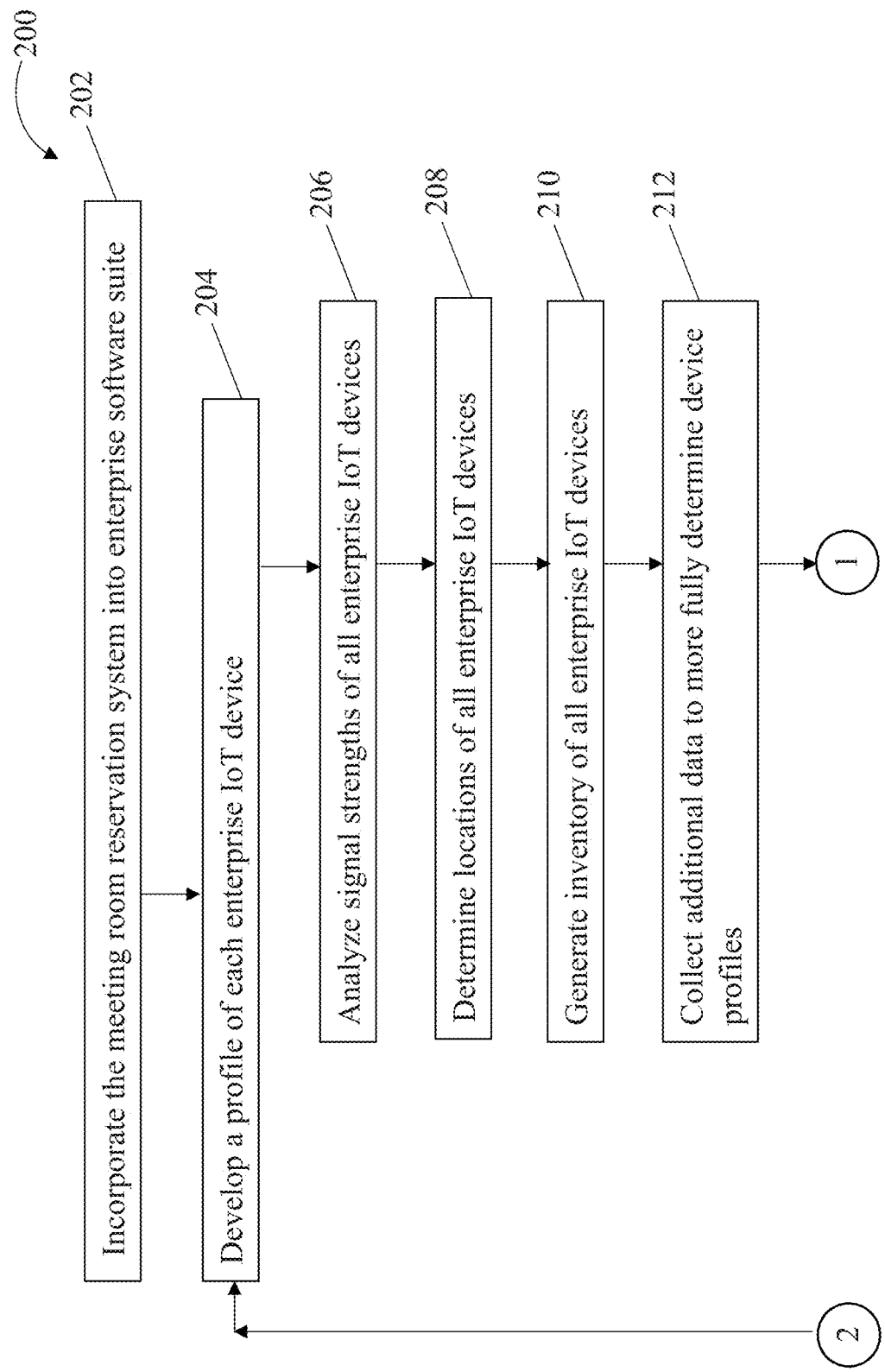
FIG. 2 is a flow chart illustrating a process for preparing a system for reserving one or more meeting rooms, in accordance with some embodiments of the present disclosure.
Figure 2:
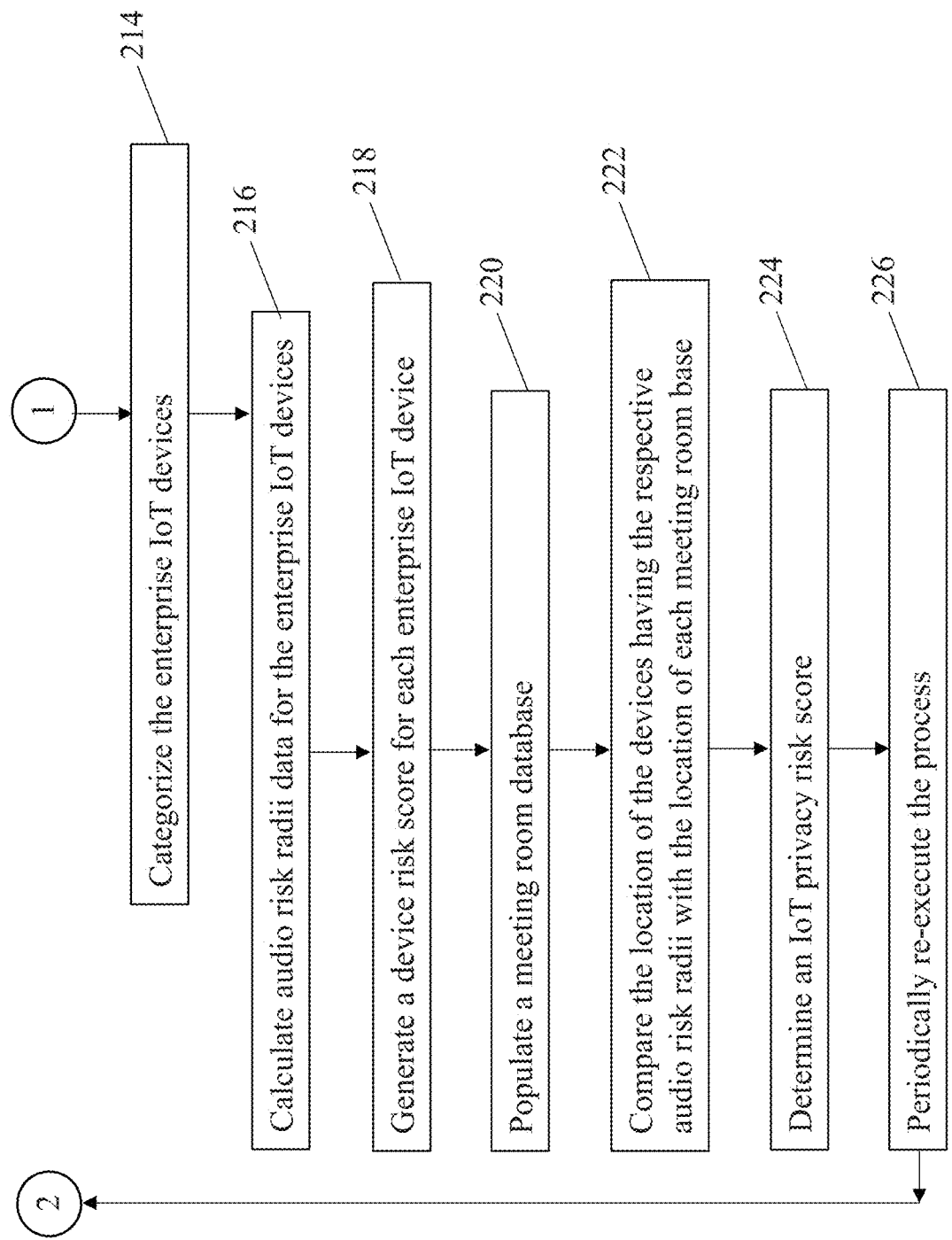

Referring to FIG. 2, a flow chart is provided illustrating a process 200 for preparing a system for reserving one or more meeting rooms. Also referring to FIG. 1, the process 200 includes incorporating 202 the meeting room reservation system 120 into the enterprise software suite, including the computer system 100. In some embodiments, the meeting room reservation system 120 is incorporated into an existing meeting room selection software tool. In at least one embodiment, the meeting room reservation system 120 is implemented as a stand-alone meeting room selection software tool within computer system 100. The process 200 also includes developing 204 a profile of each enterprise IoT device that has the potential to be in a meeting room, or at least proximate thereto. In at least one embodiment, the signal strengths of all known enterprise IoT devices are analyzed 206. The signal strength analysis operation 206 is performed in relation to one or more of an existing router, a centralized point, and an inspecting device within the enterprise's facility. The data captured through the signal strength analysis operation 206 is at least partially indicative of the transmission capabilities of each respective device. The resulting signal strength data is entered into the enterprise IoT device profiles database 172. In general, signal strength is measured through a physical scan of the areas under consideration, and a measured signal strength of a device less than approximately −85 decibels in relation to a milliwatt (dBm) is unlikely to pose a transmission or recording threat. In at least some embodiments, the signal strength of non-enterprise IoT devices are tested as well in order to populate the enterprise IoT device profiles database 172 with such devices that have the potential to be present within the enterprise's facility such that external security threats are also analyzed.

The location of each enterprise IoT device is determined 208. In at least one embodiment, the enterprise employs true range multilateration techniques, i.e., trilateration to precisely identify the location of all IoT devices within the enterprise's facility. Employing the trilateration techniques to locate the devices through their electronic transmission and receiving signatures facilitates locating those IoT devices that may not have been located through a physical, visual inventory, that in at least some embodiments, is also employed. In addition, the details of the transmitting and receiving attributes of the devices located may provide further useful data for inclusion in the enterprise IoT device profiles database 172. In at least some embodiments, these device location operations 208 facilitate generating 210 an inventory of the known devices within the facility. In addition, in some embodiments, the enterprise IoT device profiles database 172 includes the type of device, e.g., and without limitation, land-line telephones, laptop computers, desktop computers, presentation recording cameras, smart presentation boards, enterprise mobile devices such as smart phones, pads, and smart watches, and otherwise seemingly innocuous devices such as, and without limitation, Internet-connected refrigerators.

Further, in some embodiments, additional data is collected 212 to more fully determine a device profile of each respective device in the device inventory. For example, in some embodiments, the enterprise IoT device profiles database 172 includes external factors and knowledge to enhance the security analyses of respective device profiles, including, and without limitation, news focused on determining device attacks at similar companies available from predetermined outlets, tracking known intrusion attempts on the present enterprise's network, and tracking known recalls for devices with potential security deficiencies. In addition, for example, and without limitation, additional external information includes established intrusions on specific pieces of enterprise equipment, or substantially equivalent to such equipment, that have occurred at the present enterprise or other enterprises, known data attacks, whether successful or not, that have occurred on the respective equipment, and if there have been any OEM recalls of the respective equipment. Moreover, such external factors and knowledge may include a collection of available technical data from the OEMs and known reviews and analyses of the equipment.

Moreover, in at least some embodiments, to more fully accommodate the additional data collection operation 212, the enterprise IoT device profiles database 172 includes the captured metadata of each of the enterprise's IoT devices, where such metadata includes, without limitation, any assigned unique identifier (UID), make, model, device name, broadcasting bands, capturing capabilities, and microphone sensitivity.

In at least some embodiments, the captured metadata and the captured data of the enterprise devices in such an inventory of existing devices within the facility may be used to categorize 214 the enterprise IoT devices. In at least one embodiment, a first portion of the devices is categorized 214 as "suspicious" and at least a second portion of the devices is categorized 214 as "normal." In at least some embodiments, a numerical range is determined to assign numerical values across the spectrum of "suspicious" and "normal," where a numerical range is assigned to those enterprise devices that range between "suspicious" that would receive a relatively lower numerical value than enterprise devices exhibiting "normal" behavior that would receive a relatively higher numerical value. The relative numerical values would fall along a spectrum developed by the enterprise based on factors that include, without limitation, the nature, frequency, and severity of the suspicious behavior. In addition to the enterprise devices, devices that may be brought onto the premises of the enterprise may also be considered similarly. The numerical values and/or the categorizations of the "suspicious" and "normal" equipment are captured into the enterprise IoT device profiles database 172. In some embodiments, any categorization methods are used to differentiate the various enterprise IoT devices with a high-level quality factor for efficient and effective discrimination of the devices.

In at least some embodiments, the process 200 described herein includes considering the various ways that data can be breached in certain environments, including, without limitation, listening in on real time conversations that are happening in person or on a phone call through a mobile device, and recording sensitive data on a whiteboard through a conference room camera or a mobile device. In addition, the enterprise IoT device profiles database 172 is further populated with non-enterprise device data and metadata such that real-time notifications are transmitted to attendees of particular meetings of certain levels of security via various platforms that include, without limitation, mobile computing devices such as laptop computers, smart phones, and smart watches in the event that the privacy score (discussed further herein) dynamically changes. In at least one embodiment, the enterprise IoT device profile data and metadata 174 is entered into the enterprise IoT device profiles database 172 through one or more input devices included within the other devices 160. Therefore, any potential security issues are either mitigated before the meeting or detected during the meeting. Accordingly, the combination of the collected data and metadata of the enterprise devices is used to develop the respective device profiles, where the detailed descriptions and evaluations of all of the enterprise IoT devices on the premises are collected and maintained within the enterprise IoT device profiles database 172 to determine the risk factors with each device as described further herein.

In one or more embodiments, the process 200 includes calculating 216 the audio risk radii 126 through the audio risk radius module 124 that is configured to calculate the audio risk radii 126 that is based on at least the captured enterprise IoT device data and metadata 174 that includes, without limitation, recording sensitivities and capabilities of the enterprise IoT devices captured in the enterprise IoT device profiles database 172. In some embodiments, the calculated audio risk radii 126 is stored in the enterprise IoT device profiles database 172.

The audio risk radius module 124 is configured to calculate audio risk radii 126 that is based on at least the captured recording sensitivities and capabilities of the enterprise IoT devices captured in the enterprise IoT device profiles database 172. Based at least in part on the capturing capabilities and the microphone sensitivities associated with each device, the audio risk distance threshold value, i.e., radius 126 is calculated, where the audio risk radius 126 is an estimated maximum distance by which a device's microphone could accurately record conversations. In some embodiments, the known enterprise devices are individually tested to either determine or confirm their capabilities in the particular office space in which they reside, or where they have the potential to be moved. In some embodiments, the calculated audio risk radii 126 is stored in the enterprise IoT device profiles database 172. Accordingly, the established risk associated with each respective enterprise IoT device is at least partially established through determination of the respective devices listening capabilities.

In at least some of the embodiments, the enterprise IoT device profiles module 122 is configured to generate 218 a device risk score 128 that is calculated and assigned to each enterprise IoT device. The device risk score 128 is partially based on the capturing of the capabilities and the microphone sensitivities associated with each respective device per the profile development operation 204, such data maintained as enterprise IoT device data and metadata 174 in the enterprise IoT device profiles database 172. For example, numerical values are assigned to the presence and listening capabilities of a microphone on the device based on a scale determined by the enterprise as a function of the spectrum of capabilities across a range of the enterprise's known devices.

The device risk score 128 is also partially based on the historic behavior of each respective device, where a numerical range is assigned to those enterprise devices that range between "suspicious" that would receive a relatively lower numerical value than enterprise devices exhibiting "normal" behavior that would receive a relatively higher numerical value. The relative numerical values would fall along a spectrum developed by the enterprise based on factors that include, without limitation, the nature, frequency, and severity of the suspicious behavior. In addition to the enterprise devices, devices that may be brought onto the premises of the enterprise may also be considered similarly. The wireless transmission capabilities and the size of the respective antennas of the respective devices are also considered when determining the device risk score 128. In general, the more pronounced the capabilities of the enterprise devices to record and transmit the recorded information, the lower the numerical values assigned to the respective features.

In one or more embodiments, the device risk score 128 may be calculated through an algorithm such as: Device Risk Score=[(microphone)*(WiFi)*(antenna capacity)]+[(known device)*(unknown capabilities)], where "microphone," "WiFi," and "antenna capacity" represent the numerical values for the microphone capabilities, the wireless capabilities, and the capacity of the antenna to transmit the recorded information, respectively. The numerical values attributed to the "known device" factor are based on the value assigned along the "suspicious" to "normal" behavior spectrum and the "unknown capabilities" factor is a numerical value assigned to features that may not have been thoroughly determined. Accordingly, the enterprise device profiles of the respective devices include the respective device risk scores to indicate the determined security risk with each respective enterprise IoT device.

In at least some embodiments, the device risk score 128 is a calculated numerical value that is within the range of 0 to 100, where a value of 0 is indicative of a significant risk and a value of 100 is indicative of substantially no risk. In some embodiments, the spectrum is reversed such that a value of 0 is indicative of no risk and a value of 100 is indicative of a significant risk. In yet other embodiments, a different numerical range can be used, such as 1-10, or any range that enables operation of the systems and methods as described herein.

Also, in at least some embodiments, the meeting room database 176 is populated 220 with the meeting room data 178. In one or more embodiments, the meeting room data 178 includes, without limitation, attributes such as room identification numbers, location of the meeting rooms in the enterprise's office building, the physical size, i.e., the dimensions of the meeting rooms, the rated attendee capacities, the known presentation output devices, the current availability, and the known capacities of the existing information technology infrastructure, including accommodations for portable devices carried by the attendees and wireless and wired throughput capacities. In at least one embodiment, the meeting room data 178 is entered into the meeting room database 176 through one or more input devices included within the other devices 160. Accordingly, the attributes of all of the available meeting spaces are recorded into the meeting room database 176.

In at least some embodiments, the location of each known device and the respective audio risk radius 126 determined as described herein is compared 222 with the location of each meeting room stored in the meeting room database 176. The comparison operation 222 is performed by the meeting room IoT privacy module 130 based on the audio risk radii 126 and the device risk scores 128 transmitted from the audio risk radius module 124 and the enterprise device profiles module 122, respectively. In addition, the meeting room data 178 is transmitted to the meeting room IoT privacy module 130 from the meeting room data base 176 in the storage device 170. The comparison operation 222 may determine the calculated audio risk radius 126 of the associated enterprise device as presently located within the respective meeting room extends beyond one or more of the measured dimensions of the meeting room. Accordingly, matching the listening features of the respective IoT devices to the infrastructure of the enterprise facilitates establishing the specific risks associated with the respective enterprise IoT devices.

In one or more embodiments, the process includes determining 224 an IoT privacy risk score 132 for each meeting room based on the previously calculated device risk scores 128 and the calculated audio risk radii 126 for each device. In at least some embodiments, the comparison of the location of each known device and the respective audio risk radius 126 determined as described herein with the location of each meeting room stored in the meeting room database 176 is also used to calculate the IoT privacy risk score 132. In some embodiments, additional factors particular to the enterprise may be included. The determining operation 224 is performed by the meeting room IoT privacy module 130. In some embodiments, the IoT privacy risk score 132 is a calculated numerical value that is within the range of 0 to 100, where a value of 0 is indicative of significant risk and a value of 100 is indicative of substantially no risk. In at least some embodiments, an IoT privacy risk score 132 within a sub-range of 0-20 is indicative of a non-private meeting room, where multiple devices that are deemed "suspicious" are within listening range. Also, an IoT privacy risk score 132 within a sub-range of 20-50 is indicative of an average privacy meeting room, where multiple devices, classified by "normal" behavior are within listening range. Further, an IoT privacy risk score 132 within a sub-range of 50-90 is indicative of a relatively private meeting room, where few devices, classified by "normal" behavior, are within listening range. Moreover, an IoT privacy risk score 132 within a sub-range of 90-100 is indicative of an extremely private/secure meeting room, where there exists a significantly reduced opportunity for malicious/corrupted "listening"

devices. Accordingly, the privacy value for each meeting room is stored, managed, and updated as needed.

The process 200 is re-executed 226 from the develop operation 204 periodically based on, without limitation, additions of new, or upgrades of existing, enterprise IoT devices, scheduled audits, and determinations of potential security breach points.

Figure 3:
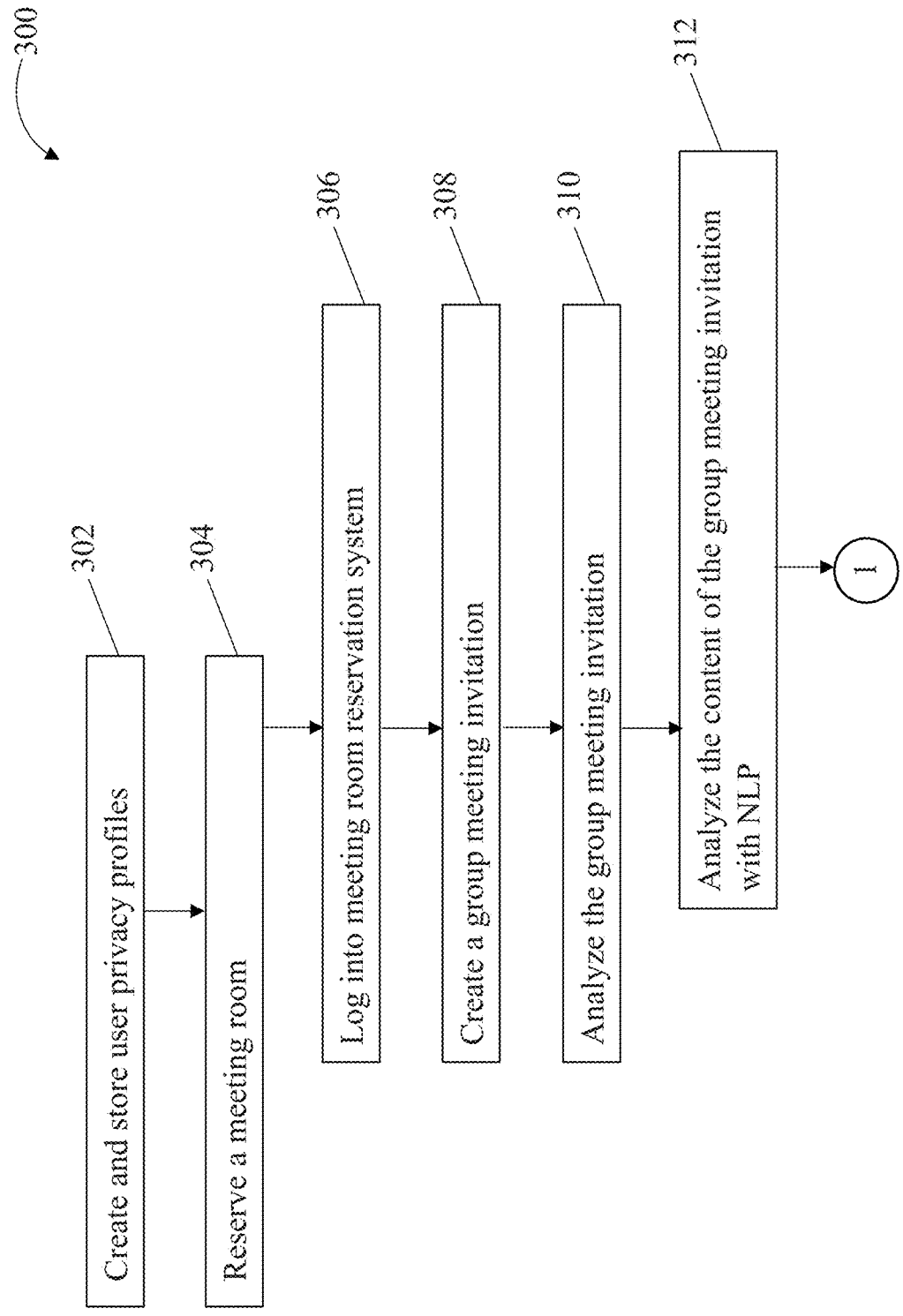
FIG. 3 is a flow chart illustrating a process for reserving one or more meeting rooms, in accordance with some embodiments of the present disclosure.
Figure 3:
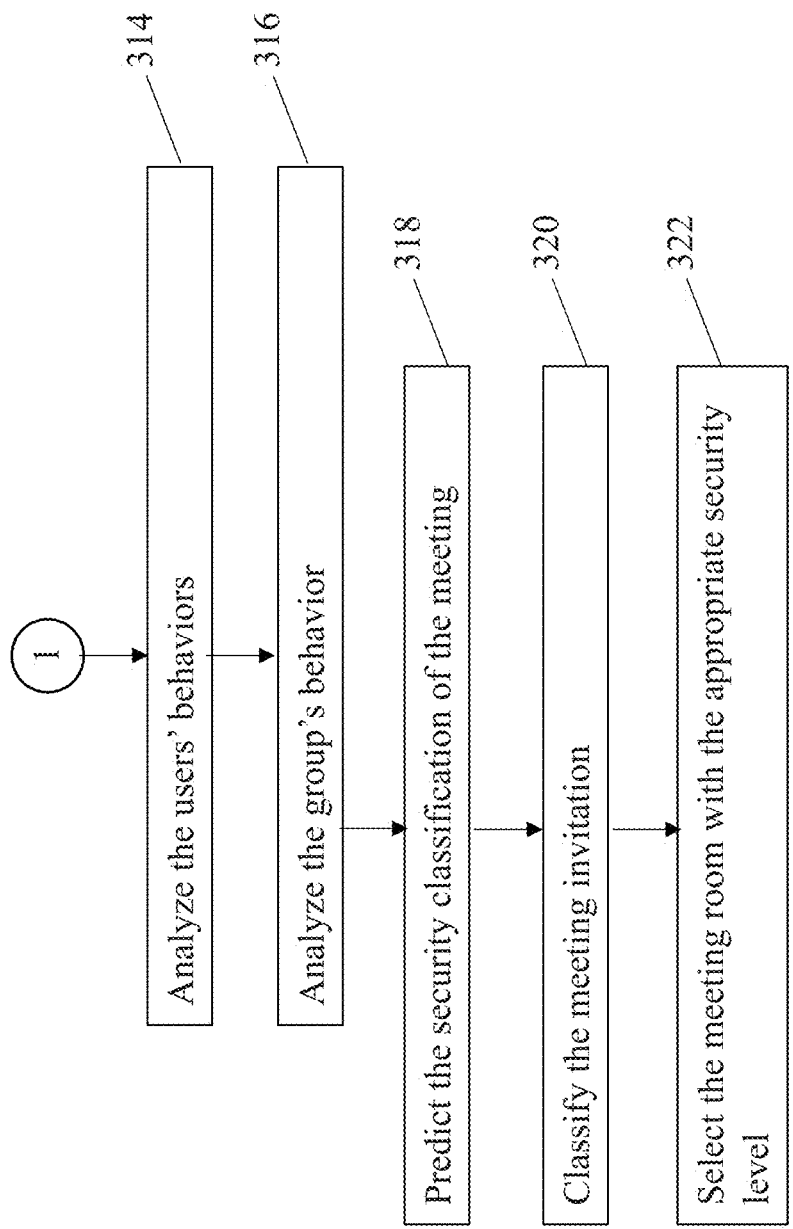

FIG. 3 is a flow chart illustrating a process 300 for reserving one or more meeting rooms using the meeting room reservation system 120 that is at least partially prepared per the process 200 shown in FIG. 2. Referring to FIGS. 1 and 3, in the process 300, the privacy profiles 140 of the potential users of the group meeting rooms are created and stored 302. In at least some embodiments, the privacy profiles 140 are created and stored 302 within the meeting room database 176 in the storage device 170. In other embodiments, the users' privacy profiles 140 are created and stored 302 in a separate database.

In addition to the previous data collection and generation per the process 200, the privacy profiles of the potential users of the group meeting rooms are stored. For example, a financial executive will likely have a privacy level requirement that is at a heightened level as compared to an engineer in the maintenance group. Specifically, in at least some embodiments, the user' privacy profiles are generated based on factors that include, without limitation, the set of assigned responsibilities and the associated workstreams, the relative level within the organization, availability of access to confidential information, frequency of obtaining access to confidential information, and frequency of use of enterprise encryption and decryption features. In some embodiments, the level of privacy established within the user' privacy profiles 140 are determined through a predefined level associated with the users' job title. Accordingly, the behaviors of the users are leveraged to assign rooms with the appropriate level of security, and the users' privacy profiles 140 are leveraged to assign rooms with the appropriate level of security as discussed further herein.

The process 300 further includes leveraging the data collected and generated per the process 200 to reserve 304 a meeting room. In one embodiment, a user logs 306 into the meeting room reservation system 120. Once logged into the application, the user creates 308 a group meeting invitation 142. The process 300 further includes the meeting room reservation system 120 analyzing 310 the group meeting invitation 142. Specifically, the meeting room reservation system 120 analyzes 310 the group meeting invitation 142 to determine the privacy level required for the group meeting. For example, highly confidential financial details of the enterprise will likely require the highest level of privacy, while routine group informational meetings will likely require a lower level of privacy. Therefore, the meeting room reservation system 120 references the users' privacy profiles 140 for creating 308 and sending the group meeting invitation 142 to the users that are the invitees to the planned group meeting. In some embodiments, if the user creating 308 and sending the group meeting invitation 142 is an administrative assistant to the user requesting the group meeting, the meeting room reservation system 120 will use the user privacy profile 140 of the meeting chairperson that requested the group meeting.

Once the group meeting invitation 142 is created 308 and submitted to the meeting room reservation system 120, the meeting room reservation system 120 uses a natural language processing (NLP) module 144 to analyze 312 the content of the group meeting invitation 142. Specifically, the NLP features in the NLP module 144 analyzes 312 at least, without limitation, the subject line, the text in the body of the group meeting invitation 142, the agenda, any attachments, and other invitation attributes. For example, a subject line of "Q4 Fiscal Review" will be deemed to be a more sensitive subject that a subject line of "Summer Golf Outing."

In addition, the meeting room reservation system will analyze 314 the previous behavior of the users that will be attendees, including the group meeting chair, that are invited to the group meeting. In at least one embodiment, the users' behavior patterns are maintained in the users' privacy profiles 140. In one or more embodiments, the users' behavior patterns are stored in the meeting room database 176. In at least some other modules, the user's behavior patterns are maintained within a separate portion of the broader computer system 100. The analysis of the individual users' meeting patterns determines, for example, and without limitation, the degree of privacy typically requested, if such requests are made, with the meeting room requests and the previous behavior of the group as a whole, or, in some embodiments, portions of the group. The analysis also includes analyzing 316 the group to determine, without limitation, if the group meets on a recurrent basis and requests meeting rooms with a certain degree of privacy. In at least one embodiment, the meeting room reservation system includes cognitive learning features that incorporate one or more learning algorithms and learning models to determine the pattern of the users' behavior and to enable the meeting room reservation system 120 to predict the users' future behaviors with respect to meeting room selection based on their previous behavior. Accordingly, the behaviors of the users are used to assign rooms with the appropriate level of security.

Once the meeting room reservation system 120 has completed the analyses operations 314 and 316, the meeting room reservation system 120 transmits the analyzed group meeting invitation 145 to the sensitivity module 146 that predicts 318 the security classification of the meeting invitations 142 by sensitivity level 148. The process 300 then proceeds to classify 320 the meeting invitation 142 accordingly. In at least one embodiment, there are three sensitivity levels 148, where three is a non-limiting value, that include low sensitivity, medium sensitivity, and high sensitivity. In at least some embodiments, the sensitivity level 148 is automatically assigned based on the participants or enterprise requirements. The meeting room is selected 322 with the appropriate security level by the meeting room selection module 150. Specifically, the sensitivity level 148 of the group meeting invitation 142 is compared with the IoT privacy risk scores 132 for each meeting room. The meeting room is selected 322 that has the IoT privacy risk score 132 corresponding to the sensitivity level 148 of the group meeting invitation 142.

As described herein, the meeting room reservation system 120 optimizes meeting room selection based on the sensitivity level 148 of the meeting and the current IoT privacy risk score 132 associated with each meeting room, both determined as described herein. In at least some of the embodiments, the meeting room reservation system 120 prioritizes the more sensitive meetings, i.e. most meetings with a high sensitivity level, and at least a portion of the medium sensitivity level and can re-assign rooms as necessary, i.e., change the meeting location of a less sensitive meeting assigned to an extremely secure room, when a more sensitive meeting for the extremely secure room is created.

In at least some embodiments, the meeting room reservation system 120 analyzes the behavior of the invitation sender and the invitees for the issued group meeting invitations as feedback into the cognitive learning features of the system. For example, and without limitation, the cognitive learning features evaluate if the invitation sender accepted or rejected the meeting room selection, and if rejected, did the invitation sender select a more, or less, secure room. In addition, in at least some embodiments, the behavior of the other attendees is analyzed as well to determine if the invitations were accepted given the selected room, or if any of the attendees suggested a different room based on the sensitivity of the subject matter of the meeting.

Furthermore, in at least some embodiments, the meeting room reservation system 120 includes sufficient flexibility to change the scheduled room and notify the attendees if either of the list of attendees, the inventory of IoT devices in the scheduled room, or the subject matter of the meeting changes such that the calculated sensitivity levels change.

In addition, in at least some embodiments, the meeting room reservation system 120 as described herein includes features that enable dynamic aspects of the system. For example, the meeting room reservation system 120 adjusts the IoT privacy risk score 132 for the room in real-time as connected devices move throughout the building. For example, and without limitation, a meeting in a room adjacent to the present meeting may start after the present meeting While the present meeting is in progress, one or more IoT devices, e.g., smart phones with the ability to capture a portion of the present meeting may be observed through their respective Bluetooth signatures. Moreover, the meeting room reservation system 120 will issue real-time notifications to the attendees in the meeting room that the IoT privacy risk score 132 decreases below a predetermined threshold value during the scheduled meeting time. Accordingly, such real-time notifications are transmitted to the attendees of particular meetings of certain levels of security via various platforms that include, without limitation, mobile computing devices such as laptop computers, smart phones, and smart watches in the event that the privacy score dynamically changes.

Accordingly, the meeting room reservation system 120 as embedded within the computer system 100, and described herein, improves the functionality of known group meeting room reservation systems through automatically integrating the aspects of a determination of meeting confidentiality levels and the determined Internet of things (IoT) privacy levels of the meeting rooms to reserve a group meeting therein.

Figure 4:
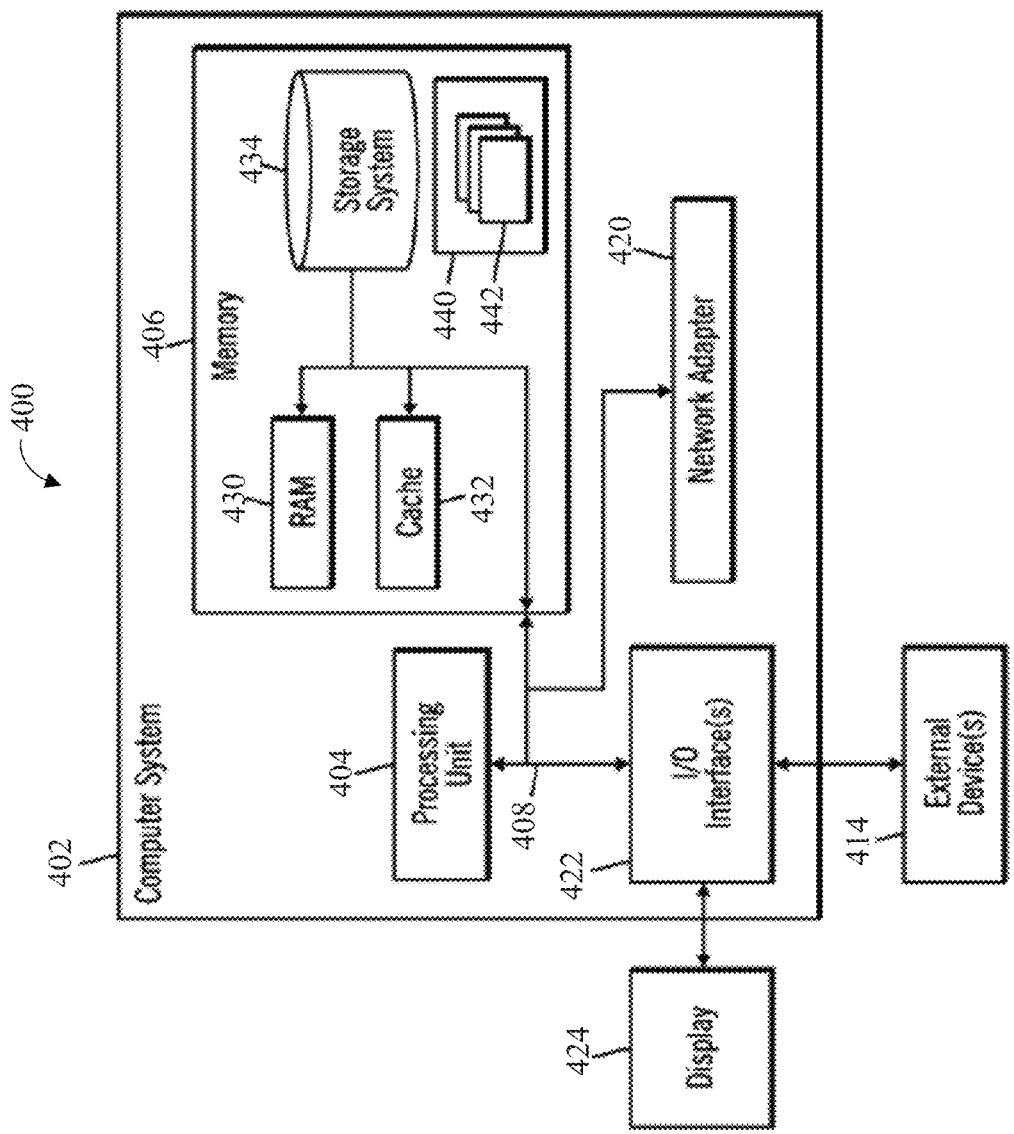
FIG. 4 is a block diagram illustrating a computer system/server of a cloud-based support system, to implement the processes described above with respect to FIGS. 1-3, in accordance with some embodiments of the present disclosure.

Aspects of the computer system 100 may be embodied in a computer system/server in a single location, or in at least one embodiment, may be configured in a cloud-based system sharing computing resources. With reference to FIG. 4, a block diagram is provided illustrating an example of a computer system 400 including a computer/server 402, hereinafter referred to as a host 402 in communication with a cloud based support system, to implement the system, tools, and processes described above with respect to FIGS. 1-3. Host 402 is operational with numerous other general purpose or special purpose computer system environments or configurations. Examples of well-known computer systems, environments, and/or configurations that may be suitable for use with host 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 402 may be described in the general context of computer system-executable instructions, such as program modules, being executed by a computer system. Generally, program modules may include routines, programs, objects, components, logic, data structures, and so on that perform particular tasks or implement particular abstract data types. Host 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, host 402 is shown in the form of a general-purpose computing device. The components of host 402 may include, but are not limited to, one or more processors or processing devices or units 404, e.g. hardware processors, a system memory 406, and a bus 408 that couples various system components including system memory 406 to processing device 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 402 typically includes a variety of computer system readable media. Such media may be any available media that is accessible by host 402 and it includes both volatile and non-volatile media, removable and non-removable media.

Memory 406 can include computer system readable media in the form of volatile memory, such as random access memory (RAM) 430 and/or cache memory 432. By way of example only, a storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces.

Program/utility 440, having a set (at least one) of program modules 442, may be stored in memory 406 by way of example, and not limitation, as well as an operating system, one or more application programs, other program modules, and program data. Each of the operating systems, one or more application programs, other program modules, and program data or some combination thereof, may include an implementation of a networking environment. Program modules 442 generally carry out the functions and/or methodologies of embodiments as described in FIGS. 1-3.

Host 402 may also communicate with one or more external devices 414, such as a keyboard, a pointing device, etc.; a display 424; one or more devices that enable a user to interact with host 402; and/or any devices (e.g., network card, modem, etc.) that enable host 402 to communicate with one or more other computing devices. Such communication can occur via Input/Output (I/O) interface(s) 422. Still yet, host 402 can communicate with one or more networks such as a local area network (LAN), a general wide area network (WAN), and/or a public network (e.g., the Internet) via network adapter 420. As depicted, network adapter 420 communicates with the other components of host 402 via bus 408. In at least one embodiment, a plurality of nodes of a distributed file system (not shown) is in communication with the host 402 via the I/O interface 422 or via the network adapter 420. It should be understood that although not shown, other hardware and/or software components could be used in conjunction with host 402. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 406, including RAM 430, cache memory 432, and storage system 434, such as a removable storage drive and a hard disk installed in a hard disk drive.

Computer programs (also called computer control logic) are stored in memory 406. Computer programs may also be received via a communication interface, such as network adapter 420. Such computer programs, when run, enable the computer system to perform the features of the present embodiments as discussed herein. In particular, the computer programs, when run, enable the processing device 404 to perform the features of the computer system 400. As such, computer programs may represent controllers of the computer system 400.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In at least one embodiment, host 402 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a state of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
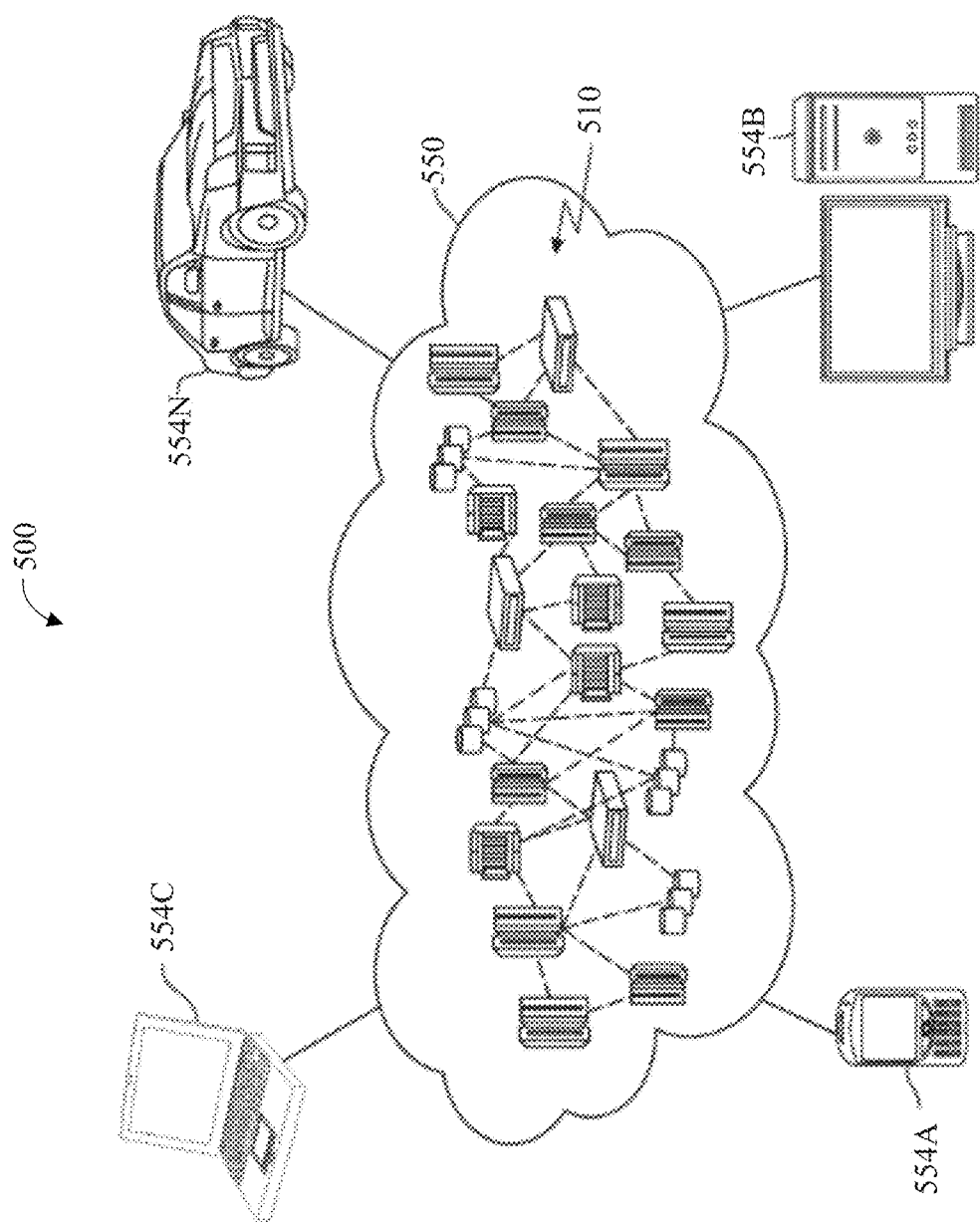
FIG. 5 is a schematic diagram illustrating a cloud computer environment, in accordance with some embodiments of the present disclosure.

Referring now to FIG. 5, a schematic diagram is provided illustrating an example cloud computing network 500. As shown, cloud computing network 500 includes a cloud computing environment 550 having one or more cloud computing nodes 510 with which local computing devices used by cloud consumers may communicate. Examples of these local computing devices include, but are not limited to, personal digital assistant (PDA) or cellular telephone 554A, desktop computer 554B, laptop computer 554C, and/or automobile computer system 554N. Individual nodes within nodes 510 may further communicate with one another. They may be grouped (not shown) physically or virtually, in one or more networks, such as Private, Community, Public, or Hybrid clouds as described hereinabove, or a combination thereof. This allows the cloud computing network 500 to offer infrastructure, platforms and/or software as services for which a cloud consumer does not need to maintain resources on a local computing device. It is understood that the types of computing devices 554A-N shown in FIG. 5 are intended to be illustrative only and that the cloud computing environment 550 can communicate with any type of computerized device over any type of network and/or network addressable connection (e.g., using a web browser).

Figure 6:
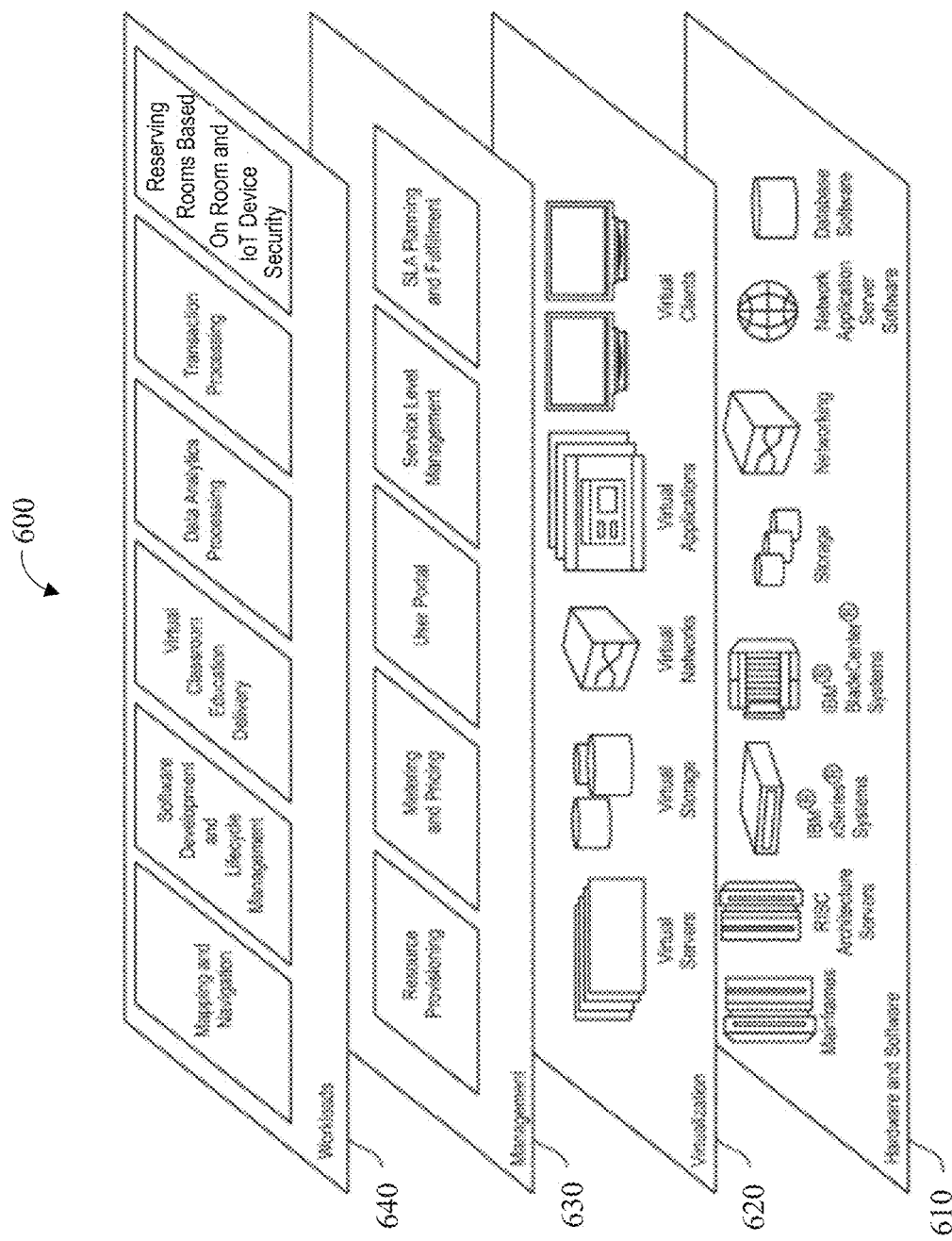
FIG. 6 is a block diagram illustrating a set of functional abstraction model layers provided by the cloud computing environment, in accordance with some embodiments of the present disclosure.

Referring now to FIG. 6, a set of functional abstraction layers 600 provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer 610, virtualization layer 620, management layer 630, and workload layer 640.

The hardware and software layer 610 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 620 provides an abstraction layer from which the following examples of virtual entities may be provided: virtual servers; virtual storage; virtual networks, including virtual private networks; virtual applications and operating systems; and virtual clients.

In one example, management layer 630 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and reserving one or more meeting rooms, and, more specifically, for reserving one or more meeting rooms based on a determination of meeting confidentiality levels and determined Internet of things (IoT) privacy levels of the one or more meeting rooms.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
   a processing device operably coupled to a memory device, wherein the memory device is configured to receive at least a portion of a meeting room database, the database including data associated with each meeting room of a plurality of meeting rooms, the processing device configured to:
   calculate, for each meeting room of the plurality of meeting rooms, a respective privacy risk score comprising:
   determine, for each meeting room of the plurality of meeting rooms, and for each Internet of Things (IoT) device of one or more IoT devices, an audio risk radius;
   analyze content of a group meeting invitation;
   determine a sensitivity level of the group meeting invitation;
   compare the sensitivity level of the group meeting invitation with the privacy risk score for each meeting room of the plurality of meeting rooms; and
   select one of the plurality of meeting rooms having a privacy risk score corresponding to the sensitivity level of the group meeting invitation.

2. The system of claim 1, wherein the processing device is further configured to:
   identify one or more IoT devices of the plurality of IoT devices located in each meeting room of the plurality of meeting rooms; and
   determine, for each IoT device of the identified one or more IoT devices, a device risk score.

3. The system of claim 2, wherein the processing device is further configured to:

determine, for each IoT device of the one or more IoT devices, a location through one or more trilateration techniques.

4. The system of claim 2, wherein the processing device is further configured to:
determine, for each IoT device of the identified one or more IoT devices and for each meeting room of the plurality of meeting rooms, one or more of:
a respective size of each meeting room of the plurality of meeting rooms, thereby at least partially determine the audio risk radius of each meeting room of the plurality of meeting rooms; and
a recording capability of each IoT device, thereby at least partially determine the device risk score for each IoT device of the identified one or more IoT devices.

5. The system of claim 4, wherein the processing device is further configured to:
further determine, for each meeting room of the plurality of meeting rooms, the privacy risk score at least partially based on, for each IoT device of the identified one or more IoT devices, the device risk score: and
further determine, for each meeting room of the plurality of meeting rooms, the audio risk score, at least partially based on captured IoT device data and metadata.

6. The system of claim 4, wherein the processing device is further configured to:
analyze, for each IoT device of the identified one or more IoT devices, one or more signal strength values with respect to one or more of a predetermined inspecting device and a predetermined centralized point; and
analyze, for each IoT device of the identified one or more IoT devices, an historic behavior of each IoT device of the identified one or more IoT devices, thereby at least partially determine the device risk score for each IoT device of the identified one or more IoT devices.

7. The system of claim 4, wherein the processing device is further configured to:
determine, for each IoT device of the identified one or more IoT devices, a location thereof; and
compare, for each IoT device of the identified one or more IoT devices, the respective determined audio risk radius against a location of each meeting room of the plurality of meeting rooms stored in the meeting room database.

8. The system of claim 1, wherein the processing device is further configured to:
analyze a user privacy profile for each invitation sender and each invitee of the group meeting invitation.

9. The system of claim 1, wherein the processing device is further configured to:
analyze the meeting invitation to determine the sensitivity level of the meeting invitation;
classify the meeting invitation with respect to the sensitivity level; and
select the meeting room of the plurality of meeting rooms through the classification of the meeting invitation and the privacy risk score.

10. The system of claim 9, wherein the processing device is further configured to:
notify each invitation sender and each invitee of the group meeting invitation when the privacy risk score dynamically decreases to a value below a predetermined threshold value during the meeting.

11. A computer program product for reserving one or more meeting rooms, the computer program product comprising:
one or more computer readable storage media; and
program instructions collectively stored on the one or more computer-readable storage media, the program instructions comprising:
program instructions to calculate, for each meeting room of the plurality of meeting rooms, a respective privacy risk score comprising:
program instructions to determine, for each meeting room of the plurality of meeting rooms, and for each Internet of Things (IoT) device of one or more IoT devices, an audio risk radius;
program instructions to analyze content of a group meeting invitation;
program instructions to determine a sensitivity level of the group meeting invitation;
program instructions to compare the sensitivity level of the group meeting invitation with the privacy risk score for each meeting room of the plurality of meeting rooms; and
program instructions to select one of the plurality of meeting rooms having a privacy risk score corresponding to the sensitivity level of the group meeting invitation.

12. A computer-implemented method comprising:
calculating, for each meeting room of a plurality of meeting rooms, a respective privacy risk score comprising:
determining, for each meeting room of the plurality of meeting rooms, and for each Internet of Things (IoT) device of one or more IoT devices, an audio risk radius;
analyzing content of a group meeting invitation;
determining a sensitivity level of the group meeting invitation;
comparing the sensitivity level of the group meeting invitation with the privacy risk score for each meeting room of the plurality of meeting rooms; and
selecting one of the plurality of meeting rooms having a privacy risk score corresponding to the sensitivity level of the group meeting invitation.

13. The method of claim 12, further comprising:
identifying one or more IoT devices located in each meeting room of the plurality of meeting rooms; and
determining, for each IoT device of the identified one or more IoT devices, a device risk score.

14. The method of claim 13, further comprising:
determining, for each IoT device of the one or more IoT devices, a location through one or more trilateration techniques.

15. The method of claim 13, further comprising:
determining, for each IoT device of the identified one or more IoT devices and for each meeting room of the plurality of meeting rooms, one or more of:
a respective size of each meeting room of the plurality of meeting rooms, thereby at least partially determining the audio risk radius of each meeting room of the plurality of meeting rooms; and
a recording capability of each device, thereby at least partially determining the device risk score for each device of the identified one or more IoT devices.

16. The method of claim 15, further comprising:
further determining, for each meeting room of the plurality of meeting rooms, the privacy risk score at least partially based on, for each IoT device of the identified one or more IoT devices, the device risk score: and further determining, for each meeting room of the plurality of meeting rooms, the audio risk score, at least partially based on captured IoT device data and metadata.

17. The method of claim 15, further comprising:
analyzing, for each IoT device of the identified one or more IoT devices, one or more signal strength values with respect to one or more of a predetermined inspecting device and a predetermined centralized point; and
analyzing, for each IoT device of the identified one or more IoT devices, an historic behavior of each IoT device of the identified one or more IoT devices, thereby at least partially determining the device risk score for each IoT device of the identified one or more IoT devices.

18. The method of claim 15, further comprising:
determining, for each IoT device of the identified one or more IoT devices, a location; and
comparing, for each IoT device of the identified one or more IoT devices, the respective determined audio risk radius against a location of each meeting room of the plurality of meeting rooms stored in the meeting room database.

19. The method of claim 12, further comprising:
analyzing a user privacy profile for each invitation sender and each invitee of the group meeting invitation;
analyzing the meeting invitation to determine the sensitivity level of the meeting invitation;
classifying the meeting invitation with respect to the sensitivity level; and
optimizing selection of the meeting room of the plurality of meeting rooms through the classification of the meeting invitation and the privacy risk score.

20. The method of claim 19, further comprising:
notifying each invitation sender and each invitee of the group meeting invitation when the privacy risk score dynamically decreases to a value below a predetermined threshold value during the meeting.

* * * * *